US012560813B2

(12) United States Patent
Zhang et al.

(10) Patent No.: US 12,560,813 B2
(45) Date of Patent: Feb. 24, 2026

(54) ELECTRONIC DEVICES WITH FRAME ANTENNAS

(71) Applicant: Apple Inc., Cupertino, CA (US)

(72) Inventors: Lijun Zhang, Los Gatos, CA (US); Jiangfeng Wu, San Jose, CA (US); Lu Zhang, Shanghai (CN); Mattia Pascolini, San Francisco, CA (US); Siwen Yong, San Francisco, CA (US); Yi Jiang, Cupertino, CA (US)

( * ) Notice: Subject to any disclaimer, the term of this patent is extended or adjusted under 35 U.S.C. 154(b) by 344 days.

(21) Appl. No.: 18/171,067

(22) Filed: Feb. 17, 2023

(65) Prior Publication Data

US 2023/0305302 A1    Sep. 28, 2023

Related U.S. Application Data

(63) Continuation of application No. PCT/US2021/046925, filed on Aug. 20, 2021.
(Continued)

(51) Int. Cl.
*G02B 27/01* (2006.01)
*G02C 1/06* (2006.01)
(Continued)

(52) U.S. Cl.
CPC ............. *G02B 27/017* (2013.01); *G02C 1/06* (2013.01); *G02C 5/008* (2013.01); *G02C 5/14* (2013.01);
(Continued)

(58) Field of Classification Search
CPC .......... G02B 27/017; G02B 2027/0178; G02C 1/06; G02C 5/008; G02C 5/14; G02C 11/10
(Continued)

(56) References Cited

U.S. PATENT DOCUMENTS 9,166,279 B2    10/2015   Jin et al.
9,728,854 B2    8/2017    Kim et al.
(Continued)

FOREIGN PATENT DOCUMENTS

CN    207518637 U    6/2018
CN    110603476 A    12/2019
CN    210465858 U    5/2020

OTHER PUBLICATIONS

Wang Yan-Yan et al., "Sub-6GHZ 4G/5G Conformal Glasses Antennas", IEEE Access, Dec. 13, 2019, pp. 182027-182036, vol. 7, IEEE.

*Primary Examiner* — William R Alexander
(74) *Attorney, Agent, or Firm* — Treyz Law Group, P.C.; Tianyi He

(57) ABSTRACT

A head-mounted device such as a pair of glasses may have display systems. The display systems may present images to eye boxes for viewing by a user. The glasses may have clear lenses through which real-world objects may be viewed from the eye boxes. The glasses may have a metal frame that surrounds the lenses and may have temples that are coupled to the frame using hinges. Radio-frequency transceiver circuitry such as cellular telephone transceiver circuitry may be coupled to one or more antennas in the head-mounted device. The antennas may have antenna resonating elements formed by placing dielectric-filled gaps in the metal frame to divide the frame into segments. Antenna resonating elements formed from segments of the metal frame may be coupled to the radio-frequency transceiver circuitry using transmission lines.

20 Claims, 10 Drawing Sheets

Related U.S. Application Data

(60) Provisional application No. 63/075,740, filed on Sep. 8, 2020.

(51) Int. Cl.
| | |
|---|---|
| *G02C 5/00* | (2006.01) |
| *G02C 5/14* | (2006.01) |
| *G02C 11/00* | (2006.01) |

(52) U.S. Cl.
CPC ...... *G02C 11/10* (2013.01); *G02B 2027/0178* (2013.01)

(58) Field of Classification Search
USPC .......................................... 359/630; 351/158
See application file for complete search history.

(56) References Cited

U.S. PATENT DOCUMENTS

| | | | |
|---|---|---|---|
| 10,171,125 B2 | 1/2019 | Mow et al. | |
| 10,312,575 B2 | 6/2019 | Kim et al. | |
| 10,476,170 B2 | 11/2019 | Rajagopalan et al. | |
| 10,816,805 B1 * | 10/2020 | Rodriguez, II | .... G02B 27/0172 |
| 2006/0132382 A1 | 6/2006 | Jannard | |
| 2010/0110368 A1 * | 5/2010 | Chaum | ................... G02C 11/10 |
| | | | 351/158 |
| 2011/0134231 A1 | 6/2011 | Hulvey et al. | |
| 2013/0169513 A1 * | 7/2013 | Heinrich | ............. H04R 25/606 |
| | | | 381/151 |
| 2013/0194141 A1 | 8/2013 | Okajima et al. | |
| 2014/0098424 A1 * | 4/2014 | Jannard | ............. G02B 27/0179 |
| | | | 29/428 |
| 2014/0194078 A1 | 7/2014 | Hikino | |
| 2014/0203982 A1 | 7/2014 | Seo et al. | |
| 2014/0218269 A1 * | 8/2014 | Cazalet | ................ G02B 6/0229 |
| | | | 345/8 |
| 2014/0333496 A1 | 11/2014 | Hu et al. | |
| 2015/0309316 A1 | 10/2015 | Osterhout et al. | |
| 2016/0204839 A1 | 7/2016 | Liu et al. | |
| 2016/0252727 A1 * | 9/2016 | Mack | ................. G02B 27/0172 |
| | | | 345/8 |
| 2018/0212314 A1 | 7/2018 | Rautio | |
| 2018/0373326 A1 | 12/2018 | Gatson et al. | |
| 2019/0227321 A1 | 7/2019 | Lee et al. | |
| 2019/0267718 A1 * | 8/2019 | Rajagopalan | ......... H01Q 1/523 |
| 2020/0068054 A1 | 2/2020 | Kim et al. | |

* cited by examiner

EFFICIENCY

BD1   BD1'      BD2 f

ELECTRONIC DEVICES WITH FRAME ANTENNAS

This application is a continuation of international patent application No. PCT/US2021/046925, filed Aug. 20, 2021, which claims priority to U.S. provisional patent application No. 63/075,740, filed Sep. 8, 2020, which are hereby incorporated by reference herein in their entireties.

FIELD

This relates generally to electronic devices, and, more particularly, to electronic devices such as head-mounted devices.

BACKGROUND

Electronic devices such as head-mounted devices may have displays for displaying images. The displays may be supported by a head-mounted support structure.

SUMMARY

A head-mounted device such as a pair of glasses may have display systems. The display systems may present images to eye boxes for viewing by a user. The glasses may have clear lenses through which real-world objects may be viewed from the eye boxes in combination with images from the display systems.

The glasses may have a metal frame that surrounds the lenses. The glasses may also have side supports that are coupled to the frame using hinges. The metal frame and/or portions of the side supports may be used in forming antennas.

Radio-frequency transceiver circuitry such as cellular telephone transceiver circuitry may be coupled to one or more of the antennas. The antennas may be formed from antenna resonating elements created by interposing dielectric-filled gaps into the metal frame that divide the metal frame into one or more segments. Antenna resonating elements formed from segments of the metal frame may be coupled to the radio-frequency transceiver circuitry using transmission lines. If desired, tunable components may be used to adjust the antennas.

DETAILED DESCRIPTION

Head-mounted devices include head-mounted support structures that allow the devices to be worn on the heads of users. A head-mounted device may have displays that display images to the user while the head-mounted device is being worn. In some configurations, waveguide systems may be used to route images from displays to eye boxes for viewing. The waveguide systems may have transparent lenses that allow a user to view real-world objects as well as computer-generated content from the displays. To support wireless communications, the head-mounted device may have antennas.

Figure 1:
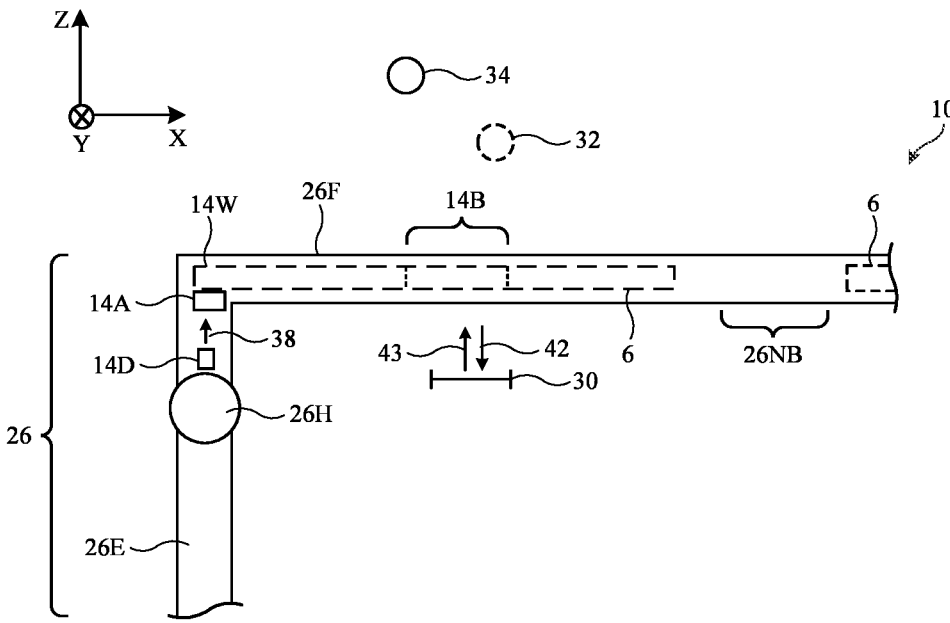
FIG. 1 is a top view of an illustrative electronic device such as a head-mounted device in accordance with an embodiment.

FIG. 1 is a top view of a portion of an illustrative head-mounted device. As shown in FIG. 1, electronic device 10, which may be a pair of glasses, may include head-mounted support structure 26 to house the components of device 10 and to support device 10 on a user's head. Support structure 26 may include, for example, structures that form housing walls and other structures at the front of device 10 such as frame 26F and elongated support structures formed along the sides of a users' face such as temples 26E. Hinges such as hinge 26H may be used to couple temples 26E to frame 26F at the left and right edges of device 10. This allows temples 26E to be folded when device 10 is not in use (e.g., when storing device 10 in a case).

Frame 26F, which may sometimes be referred to as forming a front support member, a front portion of structure 26, a front frame member, a glasses frame, or a lens frame, spans the front of a user's face, overlapping and covering a left eye box (see, e.g., eye box 30 of FIG. 1) and a right eye box. During use of device 10, when device 10 is being worn on a head of a user, the user's left eye is located in the left eye box and the user's right eye is located in the right eye box.

As shown in FIG. 1, frame 26F may include a nose bridge portion such as nose bridge portion 26NB that is configured to be supported on the nose of the user. Nose bridge portion 26NB may couple together left and right halves of frame 26F and may, if desired, include nose pads. Temples 26E, which may sometimes be referred to as side frame portions, elongated side members, elongated side support members, or elongated support structures, may be coupled respectively to the left and right sides of frame 26F by respective left and right hinges 26H. Temples 26E may help to hold the rest of structure 26 and the components supported by structure 26 on a user's face. When device 10 is being worn, images from display systems in device 10 may be viewed by the user. In particular, the user may view display images when the user's eyes are located within eye boxes (eye locations) such as eye box 30. Temples 26E may have elongated shapes with curved ends that receive the user's ears when device 10 is worn on the head of the user.

During operation of device 10, display systems in device 10 may present computer-generated images to a user's eyes in eye boxes 30. Eye boxes 30 include a left eye box (e.g., eye box 30 of FIG. 1) that receives a left image and a right eye box on the right side of device 10 that receives a right image. Device 10 may include a left display system that presents the left image to the left eye box and a right display system that presents the right image to the right eye box. In an illustrative configuration, device 10 has left and right transparent lenses 6 in front of the user's eyes (located in eye boxes 30) and has left and right display systems that each have an optical combiner assembly supported by and/or overlapping a respective one of lenses 6 that helps combine a display image (e.g., computer-generated image 32 of FIG.

1, sometimes referred to as a virtual image) with real-world image light (e.g., light from real-world objects such as object 34 of FIG. 1). Optical combiner assemblies may include waveguides (e.g., waveguides formed from portions of left and right transparent lenses 6 and/or waveguide structures supported by the left and right transparent lenses), optical couplers (e.g., input couplers that help couple images into the waveguides and output couplers that help couple images from the waveguides out of the waveguides towards eye boxes 30 for viewing by the user while passing real-world images to the user, and/or other components.

In the example of FIG. 1, device 10 has displays (display systems) on the left and right sides of structure 26. As shown in FIG. 1, each display includes a display device 14D, input coupler 14A, waveguide 14W, and output coupler 14B. Display device 14D may be, as an example, a projector such as a scanning mirror device or other device that supplies an image for the user's left eye. Image light 38 from display device 14D may be supplied to input coupler 14A, which couples light 38 into waveguide 14W. Image light 38 is then transported laterally within waveguide 14W to a location in front of eye box 30 in accordance with the principal of total internal reflection. Waveguide 14W may be supported by and/or incorporated into a transparent lens such as lens 6 that is held in place in front of the user's eye and eye box 30 by support structure 26 (e.g., frame 26F). Input coupler 14A may be a prism, holographic input coupler, grating, and/or other input coupler that is configured to couple image light from device 14D into waveguide 14W. Waveguide 14W may be formed from a layer of transparent material (e.g., polymer, glass, etc.) that is configured to convey the image light from device 14D laterally (in the +X direction of FIG. 3) towards the center of frame 26F. Output coupler 14B may be a holographic output coupler, a grating, and/or other optical element configured to couple image light 38 out of waveguide 14W in direction 42 for viewing from eye box 30. Structures such as output coupler 14B, waveguide 14W, and lens 6 are transparent, so that a user can view the real world (e.g. these structures allow a user with an eye in eye box 30 to view real-world objects such as object 34 in direction 43).

Figure 2:
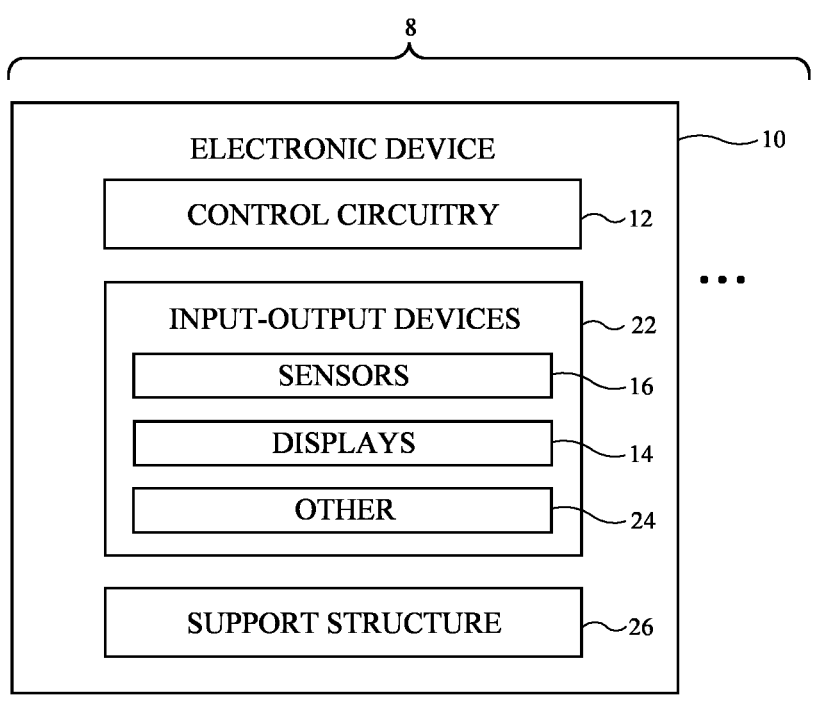
FIG. 2 is schematic diagram of an illustrative system with an electronic device in accordance with an embodiment.

A schematic diagram of an illustrative system that may include head-mounted device 10 is shown in FIG. 2. As shown in FIG. 2, system 8 may have one or more electronic devices. The electronic devices in system 8 may include a head-mounted device (e.g., device 10 of FIG. 1), accessories such as headphones, associated computing equipment (e.g., a cellular telephone, tablet computer, laptop computer, desktop computer, and/or remote computing equipment that supplies content to a head-mounted device), and/or other devices that communicate with the head-mounted device.

Each electronic device may have control circuitry 12. Control circuitry 12 may include storage and processing circuitry for controlling the operation of the electronic device. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network transceiver circuitry (e.g., WiFi® circuitry), millimeter wave transceiver circuitry, and/or other wireless communications circuitry.

To support interactions with external equipment, control circuitry 12 may be used in implementing communications protocols. Communications protocols that may be implemented using control circuitry 12 include internet protocols, wireless local area network protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols, cellular telephone protocols, multiple-input and multiple-output (MIMO) protocols, antenna diversity protocols, satellite navigation system protocols such as global positioning system (GPS) protocols and global navigation satellite system (GLONASS) protocols, IEEE 802.15.4 ultra-wideband communications protocols or other ultra-wideband communications protocols, etc.

During operation, the communications circuitry of the devices in system 8 (e.g., the communications circuitry of control circuitry 12 of device 10) may be used to support communication between the electronic devices. For example, one electronic device may transmit video data, audio data, and/or other data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Each electronic device in system 8 such as head-mounted device 10 may include input-output devices 22. Input-output devices 22 may be used to allow a user to provide device 10 with user input. Input-output devices 22 may also be used to gather information on the environment in which each device is operating. Output components in devices 22 may allow each electronic device to provide a user with output and may be used to communicate with external electrical equipment.

As shown in FIG. 2, input-output devices 22 may include one or more displays such as displays 14. In some configurations, an electronic device such as head-mounted device 10 may include left and right display devices. Device 10 may, for example, include left and right components such as left and right scanning mirror display devices or other image projectors, liquid-crystal-on-silicon display devices, digital mirror devices, or other reflective display devices, left and right display panels based on light-emitting diode pixel arrays (e.g., organic light-emitting display panels or display devices based on pixel arrays formed from crystalline semiconductor light-emitting diode dies), liquid crystal display panels, and/or or other left and right display devices that provide images to left and right eye boxes for viewing by the user's left and right eyes, respectively.

During operation, displays 14 may be used to display visual content for a user of device 10. The content that is presented on displays 14 may include virtual objects and other content that is provided to displays 14 by control circuitry 12. This virtual content may sometimes be referred to as computer-generated content. Computer-generated content may be displayed in the absence of real-world content or may be combined with real-world content. In some configurations, a real-world image may be captured by a camera (e.g., a forward-facing camera, sometimes referred to as a front-facing camera) so that computer-generated content may be electronically overlaid on portions of the real-world image (e.g., when device 10 is a pair of virtual reality goggles). In other configurations, optical combiner systems (e.g., waveguides, output couplers, transparent lenses, etc.) may be used to allow real-world images and computer-generated images to be simultaneously viewed by a user.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional light detection and ranging sensors, sometimes referred to as lidar sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, capacitive proximity sensors, light-based (optical) proximity sensors, other proximity sensors, force sensors (e.g., strain gauges, capacitive force sensors, resistive force sensors, etc.), sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, circuits for receiving wireless power, circuits for transmitting power wirelessly to other devices, batteries and other energy storage devices (e.g., capacitors), joysticks, buttons, and/or other components.

Electronic device 10 may have head-mounted support structures such as head-mounted support structure 26 (e.g., head-mounted housing structures such as housing walls, straps, etc.). The head-mounted support structure may be configured to be worn on a head of a user (e.g., on the user's face in front of the user's eyes) during operation of device 10 and may support displays 14, sensors 16, other components 24, other input-output devices 22, and control circuitry 12.

Figure 3:
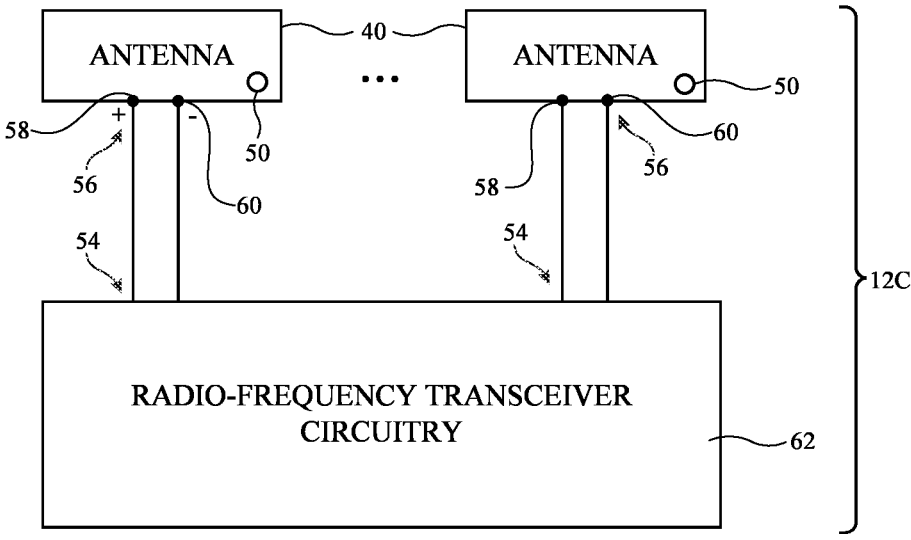
FIG. 3 is a diagram of illustrative wireless communications circuitry for an electronic device in accordance with an embodiment.

FIG. 3 is a diagram of illustrative wireless communications circuitry for device 10. Wireless circuitry 12C of FIG. 3 may include radio-frequency transceiver circuitry 62 for handling various radio-frequency communications bands. Transceiver circuitry 62 may include wireless local area network (WLAN) and wireless personal area network (WPAN) transceiver circuitry. Transceiver circuitry 62 may handle 2.4 GHz and 5 GHz bands for WiFi® (IEEE 802.11) communications or other WLAN bands and may handle the 2.4 GHz Bluetooth® communications band or other WPAN bands. Circuitry 62 may also include cellular telephone transceiver circuitry for handling wireless communications in frequency ranges (communications bands) between 600 MHz and 6 GHz and/or other cellular communications bands such as a cellular low band (LB) from 600 to 960 MHz, a cellular low-midband (LMB) from 1410 to 1510 MHz, a cellular midband (MB) from 1710 to 2170 MHz, a cellular high band (HB) from 2300 to 2700 MHz, a cellular ultra-high band (UHB) from 3300 to 5850 MHz, or other communications bands between 600 MHz and 5850 MHz (e.g., a frequency between 500 MHz and 6 GHz) or other suitable frequencies (as examples). The cellular telephone transceiver circuitry may handle voice data and non-voice data.

If desired, circuitry 62 may include satellite navigation system circuitry such as Global Positioning System (GPS) receiver circuitry for receiving GPS signals at 1575 MHz or for handling other satellite positioning data (e.g., GLONASS signals at 1609 MHz). Satellite navigation system signals for circuitry 62 are received from a constellation of satellites orbiting the earth. Circuitry 62 can include circuitry for other short-range and long-range wireless links if desired. For example, circuitry 62 may include circuitry for receiving television and radio signals, paging system transceivers, near field communications (NFC) transceiver circuitry (e.g., an NFC transceiver operating at 13.56 MHz or another suitable frequency), etc.

In NFC links, wireless signals are typically conveyed over a few inches at most. In satellite navigation system links, cellular telephone links, and other long-range links, wireless signals are typically used to convey data over thousands of feet or miles. In WLAN and WPAN links at 2.4 and 5 GHz and other short-range wireless links (e.g., WiFi® links at 2.4-8 GHz), wireless signals are typically used to convey data over tens or hundreds of feet. Antenna diversity schemes may be used if desired to ensure that antennas that have become blocked or that are otherwise degraded due to the operating environment of device 10 can be switched out of use and higher-performing antennas used in their place.

Transceiver circuitry 62 may include ultra-wideband (UWB) transceiver circuitry that supports communications using the IEEE 802.15.4 protocol and/or other ultra-wideband communications protocols. In an IEEE 802.15.4 system, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals). UWB transceiver circuitry in circuitry 62 may operate at one or more ultra-wideband communications frequencies between about 5 GHz and about 8.3 GHz, between 3 GHz and 10 GHz, and/or at other frequencies (e.g., a 6.5 GHz UWB communications band, an 8 GHz UWB communications band, and/or bands at other suitable frequencies). As an example, device 10 may transmit and/or receive radio-frequency signals at ultra-wideband frequencies with external wireless equipment to determine a distance between device 10 and the external wireless equipment and/or to determine an angle of arrival of radio-frequency signals (e.g., to determine the relative orientation and/or position of the external wireless equipment with respect to device 10). The external wireless equipment may be an electronic device in system 8 such as device 10 or may include any other desired wireless equipment. Radio-frequency signals handled by device 10 in an ultra-wideband communications band and using an ultra-wideband communications protocol may sometimes be referred to herein as ultra-wideband signals. Radio-frequency signals transmitted and/or received by device 10 in other communications bands (e.g., using communications protocols other than an ultra-wideband communications protocol) may sometimes be referred to here as non-ultra-wideband (non-UWB) signals. Non-UWB signals handled by device 10 may include, for example, radio-frequency signals in a cellular telephone communications band, a WLAN communications band, etc.

Wireless circuitry 12C may include antennas 40. Antennas 40 may be formed using any suitable types of antenna structures. For example, antennas 40 may include antennas with resonating elements that are formed from loop antenna structures, patch antenna structures, inverted-F antenna structures, slot antenna structures, planar inverted-F antenna structures, helical antenna structures, dipole antenna structures, monopole antenna structures, hybrids of two or more of these designs, etc. If desired, one or more of antennas 40 may be cavity-backed antennas.

Different types of antennas may be used for different bands and combinations of bands. For example, one type of antenna may be used in forming a local wireless link antenna and another type of antenna may be used in forming a remote wireless link antenna. Dedicated antennas may be used for conveying radio-frequency signals in a particular band. For example, antennas 40 may be configured to handle only cellular telephone signals or only wireless local area network signals. If desired, antennas 40 may only handle signals for a UWB communications band (e.g., UWB signals) or antennas 40 can be configured to convey both radio-frequency signals in a UWB communications band and radio-frequency signals in non-UWB communications bands (e.g., wireless local area network signals and/or cellular telephone signals). Antennas 40 can include two or more antennas for handling signals in a given band signals (e.g., to implement a MIMO scheme). For example, at least two, at least four, or other set of multiple antennas 40 may be used by circuitry 62 to handle cellular signals.

Space may be at a premium in electronic device 10. In order to minimize space consumption within device 10, the same antenna 40 may be used to cover multiple communications bands. For example, each antenna 40 may be used to cover multiple cellular telephone bands between 600 MHz and 6 GHz and/or other suitable frequency range.

In general, transceiver circuitry 62 may include one or more radio-frequency transceivers (e.g., GPS receiver circuitry, WLAN/WPAN circuitry, cellular telephone transceiver circuitry, and/or UWB transceiver circuitry). Transceiver circuitry 62 may be coupled to antennas 40 using radio-frequency transmission line path such as radio-frequency transmission line paths 54.

To provide antenna structures such as antennas 40 with the ability to cover communications frequencies of interest, antennas 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antennas 40 may be provided with adjustable circuits such as tunable components 50 to tune the antennas over communications (frequency) bands of interest. Tunable components 50 may be part of a tunable filter or tunable impedance matching network, may be part of an antenna resonating element, may span a gap between an antenna resonating element and antenna ground, etc.

Tunable components 50 may include switches, tunable inductors, tunable capacitors, and/or other adjustable components. Tunable components such as these may be based on switches and networks of fixed components, distributed metal structures that produce associated distributed capacitances and inductances, variable solid-state devices for producing variable capacitance and inductance values, tunable filters, or other suitable tunable structures. During operation of device 10, control circuitry 12 may issue control signals on one or more control paths that adjust inductance values, capacitance values, or other parameters associated with tunable components 50, thereby tuning antennas 40 to cover desired communications bands. Antenna tuning components that are used to adjust the frequency response of antennas 40 such as tunable components 50 may sometimes be referred to herein as antenna tuning components, tuning components, antenna tuning elements, tuning elements, adjustable tuning components, adjustable tuning elements, switches, or adjustable components.

Radio-frequency transmission lines 54 may include positive and ground signal paths. Radio-frequency transmission lines 54 may include coaxial cable transmission lines, stripline transmission lines, microstrip transmission lines, structures implemented using metalized vias, edge-coupled microstrip transmission lines, edge-coupled stripline transmission lines, waveguide structures (e.g., coplanar waveguides or grounded coplanar waveguides), combinations of these types of radio-frequency transmission lines and/or other transmission line structures.

If desired, the positive signal conductor and ground signal conductor of each radio-frequency transmission line 54 may be formed from metal traces on rigid and/or flexible printed circuits. In one suitable arrangement, radio-frequency transmission lines may include metal traces integrated within multilayer laminated structures (e.g., layers of a conductive material such as copper or other metal and a dielectric material such as a resin that are laminated together without or without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to accommodate other device components and may be rigid enough to hold its shape after folding without being held in place by stiffeners or other structures).

A matching network (e.g., an adjustable matching network formed using tunable components 50) may include components such as inductors, resistors, and capacitors used in matching the impedance of each antenna 40 to the impedance of a respective radio-frequency transmission line 54. Matching network components may be provided as discrete components (e.g., surface mount technology components) or may be formed from housing structures, printed circuit board structures, traces on polymer supports, etc. Components such as these may also be used in forming filter circuitry in antenna 40 and may be tunable and/or fixed components. In some configurations, the presence of the user's head near antennas 40 may affect antenna performance (e.g., antenna resonating frequency and/or input impedance). Impedance matching circuitry for antennas 40 may be configured to help accommodate altered antenna impedance characteristics exhibited when device 10 is being worn on the head versus when device 10 is not being worn on the head. Switches in components 50 may, as an example, be adjusted depending on whether device 10 is in an on-head or off-head operating mode.

Radio-frequency transmission lines 54 may be coupled to antenna feed structures associated with antennas 40. As an example, each antenna 40 may form an inverted-F antenna, a slot antenna, a monopole antenna, a dipole antenna, or other antenna having an antenna feed 56 with a positive antenna feed terminal such as positive antenna feed terminal 58 and a ground antenna feed terminal such as ground antenna feed terminal 60. Other types of antenna feed arrangements may be used if desired. If desired, antennas 40 may be fed using multiple feeds each coupled to a respective port of radio-frequency transceiver circuitry 62 over a corresponding radio-frequency transmission line path. In some configurations, transmission line paths may be coupled to multiple locations on a given antenna (e.g., an antenna may include multiple positive antenna feed terminals coupled to a signal conductor of a radio-frequency transmission line). Switches may be interposed on the signal lines between radio-frequency transceiver circuitry 62 and the positive antenna feed terminals if desired (e.g., to selectively activate one or more positive antenna feed terminals at any given time). The illustrative feeding configuration of FIG. 3 is merely illustrative.

Control circuitry 12 may use information from a proximity sensor, wireless performance metric data such as received signal strength information, device orientation information from an orientation sensor, device motion data from an accelerometer or other motion detecting sensor, information about a usage scenario of device 10, information about whether audio and/or video is being played, information from one or more antenna impedance sensors, information on desired frequency bands to use for communications, and/or other information in determining when antennas 40 are being affected by the presence of nearby external objects or is otherwise in need of tuning. In response, control circuitry 12 may adjust an adjustable inductor, adjustable capacitor, switch, or other tunable components such as tunable components 50 to ensure that antennas 40 operate as desired. Adjustments to tunable components 50 may also be made to extend the frequency coverage of antennas 40 (e.g., to cover desired communications bands that extend over a range of frequencies larger than antennas 40 would cover without tuning).

Antennas 40 may include antenna resonating element structures (sometimes referred to herein as radiating element structures), antenna ground plane structures (sometimes referred to herein as ground plane structures, ground structures, or antenna ground structures), an antenna feed such as antenna feeds 56, and other components (e.g., tunable components 50). Antennas 40 may be configured to form any suitable type of antenna.

Figure 4:
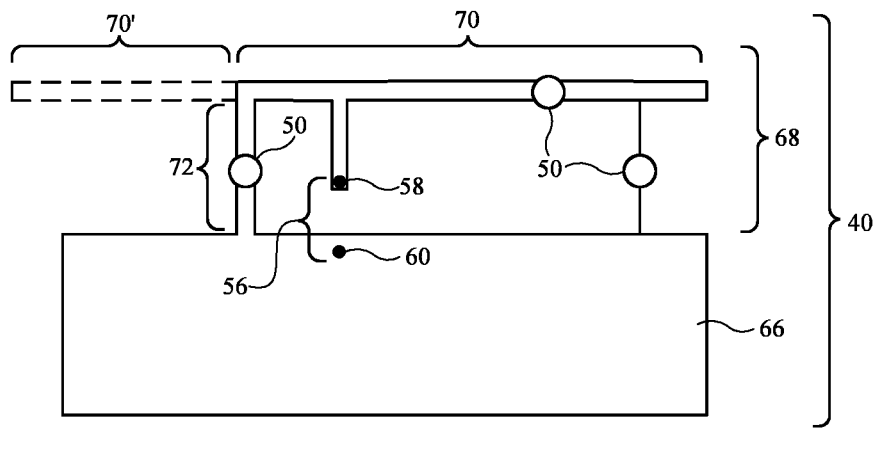
FIG. 4 is a diagram of an illustrative antenna for an electronic device in accordance with an embodiment.

FIG. 4 is a diagram of illustrative antenna structures that may be used in forming antennas 40. As shown in FIG. 4, antenna 40 may include an antenna resonating element such as antenna resonating element 68 (e.g., an inverted-F antenna resonating element) and an antenna ground (sometimes referred to herein as a ground plane) such as antenna ground 66. Antenna resonating element 68 may have a main resonating element arm such as arm 70. The length of arm 70 may be selected so that antenna 40 resonates at desired operating frequencies (e.g., where the length of arm 70 is approximately equal to one-quarter of the effective wavelength corresponding to a frequency in a communications band handled by antenna 40). Antenna resonating element 68 may also exhibit resonances at harmonic frequencies.

If desired, other conductive structures in the vicinity of arm 70 may contribute to the radiative response of antenna 40 (e.g., antenna 40 may include parasitic antenna resonating elements and/or the performance of antenna 40 may be influenced by conductive structures that are separate from arm 70 such as conductive portions of other antennas in the vicinity of antenna 40). Arm 70 may be separated from antenna ground 66 by a dielectric-filled opening (e.g., an air gap or polymer-filled gap). Antenna ground 66 may be formed from housing structures such as a metal housing structures, conductive portions of a display, conductive traces on a printed circuit board, metal portions of electronic components, or other conductive ground structures.

Arm 70 may be coupled to antenna ground 66 by one or more return paths such as return path 72. Positive antenna feed terminal 58 of antenna feed 56 may be coupled to arm 70. Ground antenna feed terminal 60 may be coupled to antenna ground 66 (e.g., antenna feed 56 may be coupled to resonating element 68 in parallel with return path 72).

If desired, antenna resonating element 68 may include more than one resonating arm to support radiation in multiple communications bands (e.g., antenna resonating element 68 may include one or more arms in addition to arm 70 such as additional arm 70' of FIG. 4). Each arm may help to support radiation in one or more respective communications bands. In one suitable arrangement, which may sometimes be described herein as an example, antenna resonating element 68 may include two arms (70 and 70') extending from opposing sides of antenna feed 56 and/or return path 72. Antenna resonating element arms such as arms 70 and/or 70' may have other shapes and may follow any desired path (e.g., paths having curved and/or straight segments). In some configurations, antenna resonating element structures such as arms 70 and/or 70' may be formed from housing structures (e.g., a peripheral conductive member that forms a ring-shaped frame for device 10 on the front face of device 10, metal housing frame members, and/or other metal housing structures).

Figure 5:
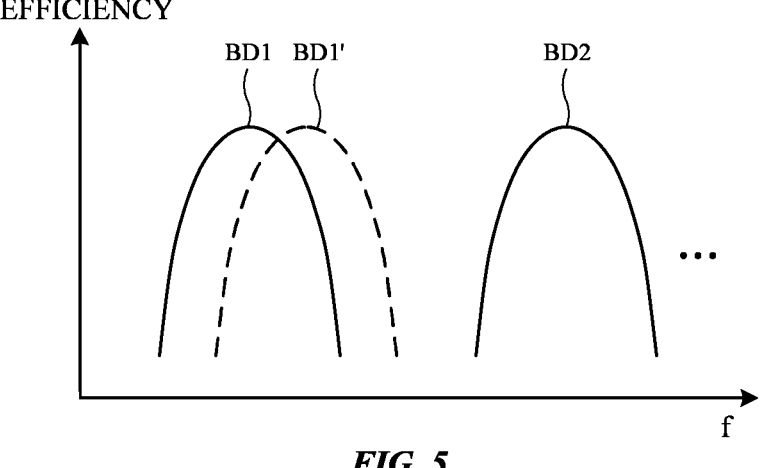
FIG. 5 is a graph in which antenna efficiency has been plotted as a function of operating frequency for an illustrative antenna in accordance with an embodiment.

If desired, antenna resonating element 68 may include one or more tunable components 50. As shown in FIG. 4, for example, components 50 may be coupled between arm 70 (and, if desired arm 70') and antenna ground 66, may be interposed in return path 72, may couple discrete segments of arm 70 (and/or arm 70') together, etc. Tunable components 50 may exhibit a capacitance, resistance, and/or inductance that is adjusted in response to control signals provided to the tunable components from control circuitry 12 (FIG. 2). FIG. 5 is an illustrative graph of antenna performance (antenna efficiency) versus frequency (e.g., a frequency range of 600 MHz to 6 GHz, frequencies above 6 GHz, frequencies below 600 MHz, etc.). As shown in FIG. 5, an antenna 40 may exhibit one or more frequency resonances such as frequency resonances BD1, BD2, . . . . Using adjustments to tunable components 50, one or more of these frequency resonances may be tuned during operation of device 10 to cover one or more desired additional frequencies of interest (see, e.g., frequency resonance BD1', which corresponds to a tuned version of frequency resonance BD1). Adjustments may be made to tunable components 50 and/or selections may be made to the sizes, shapes, and locations of antennas 40, the locations of fixed impedance matching components for antennas 40, the antenna feeds for antennas 40, and other wireless communications circuitry attributes to accommodate antenna loading effects due to the presence of a user's head against the rear surface of head-mounted device 10 (e.g., at a location that is typically within 0.5 to 10 cm of antennas 40). Antennas 40 may also be configured to radiate away from the rear of device 10 (if desired).

FIGS. 6, 7, 8, and 9 are front views of portions of device 10 in illustrative configurations in which device 10 has antennas formed from metal structures or other conductive structures in support structure 26. As an example, structure 26 may be formed from partly or completely from metal and one or more metal portions of frame 26F and/or temples 26E may be used in forming antennas 40. These metal portions may, as an example, form antenna resonating elements 68 (e.g., antenna resonating element arms such as arm 70 and/or 70' of FIG. 4, which are coupled to transmission lines 54 using antenna feeds 56).

Figure 6:
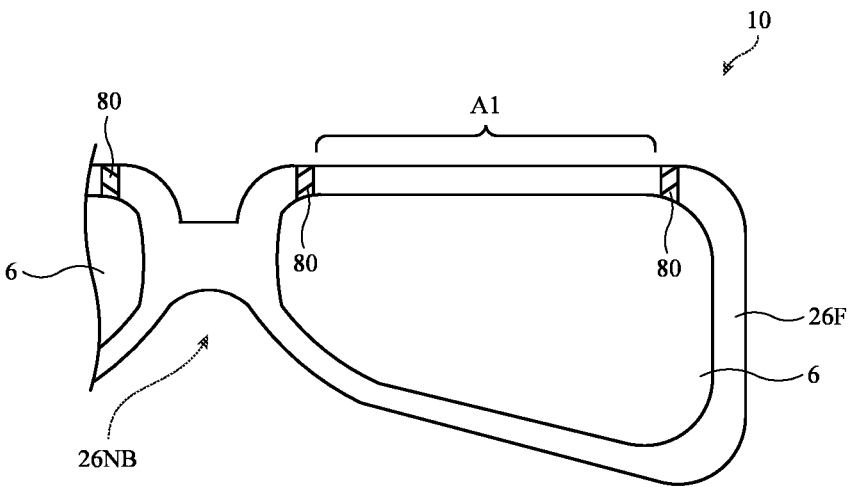
FIGS. 6, 7, 8, and 9 are front views of illustrative head-mounted devices with antennas in accordance with an embodiment.

As shown in FIG. 6, frame 26F may have portions that extend in a pair of rings around respective left and right lenses 6 while being joined at nose bridge portion 26NB. Frame 26F may be divided into segments by dielectric-filled (e.g., polymer-filled) gaps 80. By incorporating multiple gaps 80 at various locations along the length of the elongated metal structures forming frame 26F, one or more segments of frame 26F may be formed that have lengths suitable for forming antenna resonating elements for antennas 40 (see, e.g., resonating element arms 70 and 70' of FIG. 4). Antenna ground structures may be formed from ground traces on printed circuits, conductive housing structures (e.g., portions of frame 26F and/or other portions of structure 26), and/or other ground elements.

As shown in the example of FIG. 6, gaps 80 in frame 26F be used to form frame segments that form antennas such as illustrative antenna A1 (see, e.g., antennas 40 of FIG. 3). One or more frame segments may form one or more respective antennas 40 on the left of device 10 and one or more frame segments may form one or more respective antennas 40 on the right of device 10. If desired, the antenna frame segments on the left of device 10 and on the right of device 10 may be symmetrical.

In the FIG. 6 example, antenna A1 has been formed along the upper edge of frame 26F (e.g., above lens(s) 6). If desired, segments for forming antennas 40 may be formed in other portions of frame 26F. For example, as shown in FIG. 7, a segment of frame 26F that lies between a pair of dielectric-filled gaps 80 may be used to form an antenna (antenna A2) along the lower edge of frame 26F (e.g., under lens(s) 6).

Figure 7:
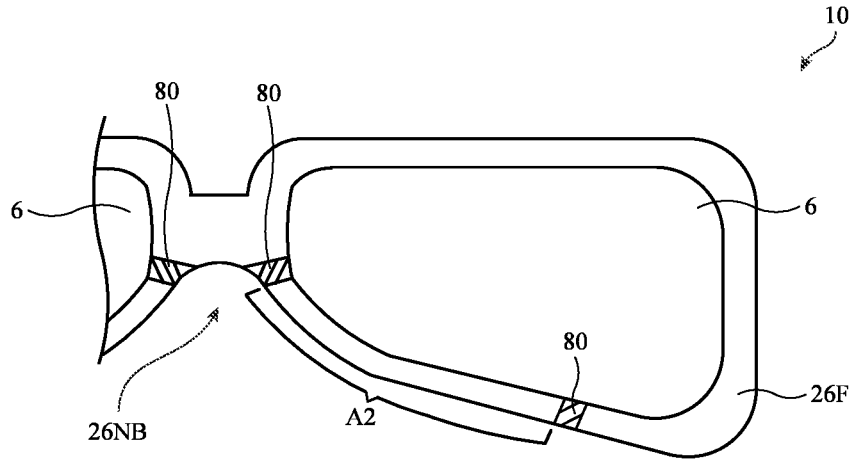
Figure 8:
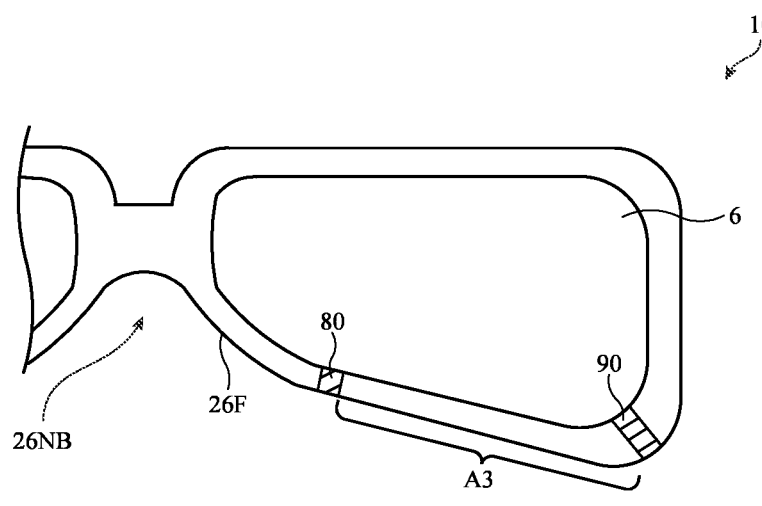

One of the ends of antenna A2 of FIG. 7 is immediately adjacent to nose bridge portion 26NB of frame 26F. If desired, gaps 80 may be formed farther from nose bridge portion 26NB. As shown in FIG. 8, for example, gaps 80 may be located on frame 26F at locations that place the antennas farther from nose bridge 26NB (e.g., so that one end of a segment of frame 26F is adjacent to the outer edges of frame 26F, as shown by illustrative antenna A3 of FIG. 8).

Figure 9:
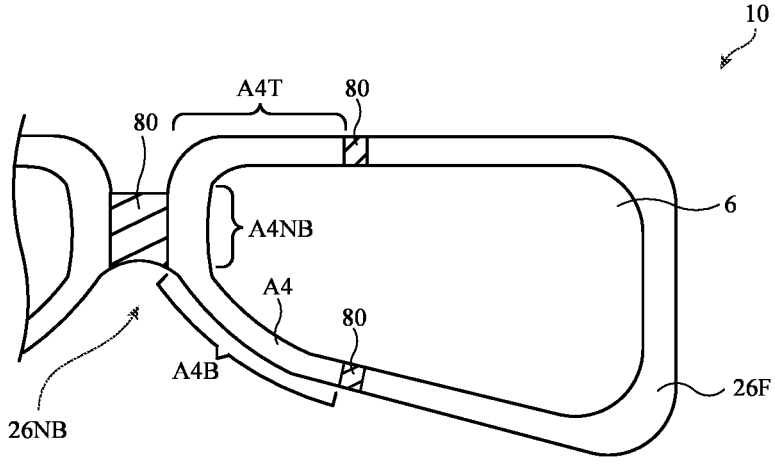

In the illustrative configuration of FIG. 9, nose bridge portion (nose bridge) 26NB has a dielectric-filled portion forming a gap 80 that electrically isolates the right half of frame 26F from the left half of frame 26F. Two other gaps 80 are formed in frame 26F to form a frame segment for antenna A4. Antenna A4 of FIG. 9 has a first portion A4T along the top edge of frame 26F above lens 6, a second portion A4NB that is adjacent to nose bridge portion 26NB (e.g., an inner side portion of frame 26F that is laterally adjacent to portion 26NB), and a third portion A4B that extends along the lower edge of frame 26F.

Figure 10:
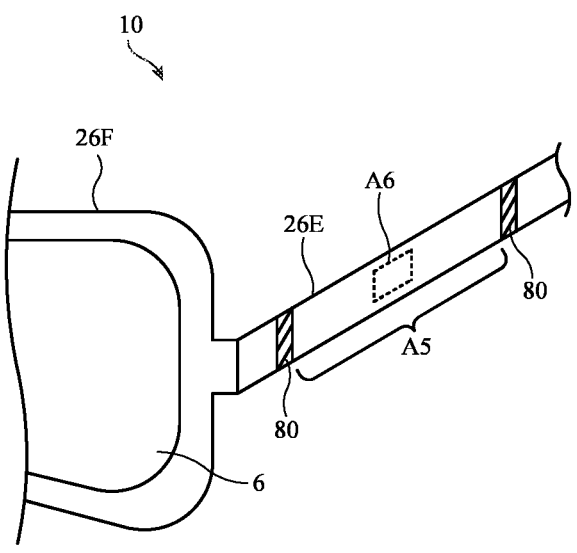
FIG. 10 is a diagram of a pair of glasses with an elongated side portion that includes an antenna in accordance with an embodiment.

If desired, antennas may be formed at one or more locations on the side support members in structure 26 (e.g., on temples 26E). Consider, as an example, device 10 of FIG. 10. In the FIG. 10 example, temple 26E has dielectric-filled gaps 80 that isolate a segment of temple 26E to form antenna A5. If desired, temple 26E or other portion of structure 26 may be formed at least partly from dielectric and one or more patch antennas or other antennas may be supported on temple 26E or other portion of structure 26 (see, e.g., illustrative patch antenna A6). In general, there may be one or more antennas on temples 26E and one or more antennas formed from frame segments or other portions of frame 26F. Antennas 40 may be evenly distributed on the left and right sides of device 10 (e.g., to implement a MIMO scheme) and/or device 10 may have asymmetrically distributed antenna structures (e.g., one or more antennas may be formed on the left side of device 10 but not the right side of device 10).

Support structure 26 may be formed from metals such as aluminum, stainless steel, titanium, nitinol, silver, gold, other elemental metals and/or metal alloys or may be formed from other conductive materials. These conductive structures may provide frame 26F with its structural strength (and, if desired, may provide temples 26E with their structural strengths). Lenses 6 may be formed from transparent glass, clear polymer, and/or other transparent materials. As described in connection with FIG. 1, device 10 may use display devices 14D to display content. This content may be content that is wirelessly received using antennas 40 and/or other computer-generated content and may, if desired, be merged with real-world content (e.g., using an optical combiner). Speakers (e.g., left and right speakers) may be located in temples 26E in alignment with a user's left and right ear positions when device 10 is worn on the user's head. In some configurations, output may be provided to a user exclusively using speakers and/or other non-display devices (e.g., haptic output devices) and displays 14 may be omitted.

In accordance with an embodiment, a pair of glasses is provided that includes a frame having lens openings; lenses in the lens openings that are aligned with eye boxes; displays configured to supply images to the eye boxes; and an antenna having an antenna resonating element formed from a segment of the frame between first and second dielectric-filled gaps in the frame.

In accordance with another embodiment, the frame includes ring-shaped metal structures that extend around the lenses, the pair of glasses includes waveguides and output couplers on the lenses that receive images from the displays and supply the received images to the eye boxes; cellular telephone transceiver circuitry coupled to the antenna at an antenna feed; left and right temples; and left and right hinges that respectively couple the left and right temples to corresponding left and right edges of the frame.

In accordance with another embodiment, the dielectric-filled gaps and the segment of the frame are formed along an upper edge of the frame above one of the lenses.

In accordance with another embodiment, the dielectric-filled gaps and the segment of the frame are formed along a lower edge of the frame below one of the lenses.

In accordance with another embodiment, left and right sides of the frame are joined at a nose bridge portion of the frame and one end of the segment is adjacent to the nose bridge portion.

In accordance with another embodiment, left and right sides of the frame are joined at a nose bridge portion of the frame and one end of the segment is adjacent to an outer side edge of frame that not adjacent to the nose bridge portion.

In accordance with another embodiment, a first of the dielectric-filled gaps is formed within an upper edge of the frame, a second of the dielectric-filled gaps is formed within a lower edge of the frame, and the segment of the frame extends from the upper edge to the lower edge past a nose-bridge portion of the frame.

In accordance with another embodiment, the pair of glasses includes radio-frequency transceiver circuitry coupled to the antenna resonating element at an antenna feed.

In accordance with another embodiment, the radio-frequency transceiver circuitry includes cellular telephone transceiver circuitry configured to operate at a frequency between 500 MHz and 6 GHz.

In accordance with another embodiment, the antenna includes a tunable component.

In accordance with an embodiment, a head-mounted device is provided that includes a frame having left and right halves coupled at a nose bridge portion; left and right elongated side members coupled by respective left and right hinges to the left and right halves; a left display system coupled to the left half that is configured to produce a left image for a left eye box, the left display system is configured to allow a real-world object to be viewed through the left display system from the left eye box; and a right display system coupled to the right half that is configured to produce a right image for a right eye box, the right display system is configured to allow the real-world object to be viewed through the right display system from the right eye box; and dielectric gaps in the frame that form a segment of the frame that serves as an antenna.

In accordance with another embodiment, the frame includes a metal member that surrounds left and right lenses and the segment includes a metal segment of the metal member that forms an antenna resonating element for the antenna.

In accordance with another embodiment, the antenna includes a cellular telephone antenna.

In accordance with another embodiment, the left display system includes a left output coupler that overlaps the left lens and the right display system includes a right output coupler that overlaps the right lens.

In accordance with another embodiment, the metal segment is formed along an upper edge of the frame.

In accordance with another embodiment, the metal segment is formed along a lower edge of the frame.

In accordance with an embodiment, a pair of glasses is provided that includes clear lenses through which real-world objects are viewable from eye boxes; display systems configured to present images in the eye boxes; a metal frame that extends around peripheral portions of the clear lenses; radio-frequency transceiver circuitry; and dielectric gaps in the metal frame that form a metal frame segment that serves as an antenna resonating element in an antenna that is coupled to the radio-frequency transceiver circuitry.

In accordance with another embodiment, the radio-frequency transceiver circuitry includes cellular telephone transceiver circuitry.

In accordance with another embodiment, the pair of glasses includes a tunable component coupled to the antenna resonating element.

In accordance with another embodiment, the antenna includes an antenna selected from the group consisting of: a monopole antenna and an inverted-F antenna.

The foregoing is merely illustrative and various modifications can be made to the described embodiments. The foregoing embodiments may be implemented individually or in any combination.

What is claimed is:

1. A pair of glasses, comprising:
a frame having lens openings;
lenses in the lens openings that are aligned with eye boxes, wherein the frame comprises ring-shaped metal structures that extend around the lenses;
left and right temples;
left and right hinges that respectively couple the left and right temples to corresponding left and right edges of the frame;
displays configured to supply images to the eye boxes; and
an antenna having an antenna resonating element formed from a segment of the frame between dielectric-filled gaps in the frame, wherein the dielectric-filled gaps and the segment of the frame are formed along an upper edge of the frame above one of the lenses.

2. The pair of glasses defined in claim 1 further comprising:
waveguides and output couplers on the lenses that receive images from the displays and supply the received images to the eye boxes; and
cellular telephone transceiver circuitry coupled to the antenna at an antenna feed.

3. The pair of glasses defined in claim 1 further comprising an additional antenna having an additional antenna resonating element formed from an additional segment of the frame between additional dielectric gaps in the frame, wherein the additional dielectric gaps and the additional segment of the frame are formed along a lower edge of the frame below one of the lenses.

4. The pair of glasses defined in claim 3 wherein left and right sides of the frame are joined at a nose bridge portion of the frame and wherein one end of the additional segment is adjacent to the nose bridge portion.

5. The pair of glasses defined in claim 3 wherein left and right sides of the frame are joined at a nose bridge portion of the frame and wherein one end of the additional segment is adjacent to an outer side edge of the frame that is not adjacent to the nose bridge portion.

6. The pair of glasses defined in claim 1 further comprising an additional antenna having an additional antenna resonating element formed from an additional segment of the frame between a first additional dielectric-filled gap in the frame above a given one of the lenses and a second dielectric-filled gap in the frame below the given one of the lenses, wherein the additional segment of the frame extends past a nose-bridge portion of the frame.

7. The pair of glasses defined in claim 1 further comprising radio-frequency transceiver circuitry coupled to the antenna resonating element at an antenna feed.

8. The pair of glasses defined in claim 7 wherein the radio-frequency transceiver circuitry comprises cellular telephone transceiver circuitry configured to operate at a frequency between 500 MHz and 6 GHZ.

9. The pair of glasses defined in claim 8 wherein the antenna comprises a tunable component.

10. The pair of glasses defined in claim 1 further comprising an additional antenna having an additional antenna resonating element formed from an additional segment of the frame between additional dielectric-filled gaps in the frame, wherein the additional dielectric-filled gaps and the additional segment of the frame are formed along an upper edge of the frame above another one of the lenses.

11. A head-mounted device, comprising:

a frame having left and right halves coupled at a nose bridge portion;

left and right elongated side members coupled by respective left and right hinges to the left and right halves;

a left display system coupled to the left half that is configured to produce a left image for a left eye box, wherein the left display system is configured to allow a real-world object to be viewed through the left display system from the left eye box; and a right display system coupled to the right half that is configured to produce a right image for a right eye box, wherein the right display system is configured to allow the real-world object to be viewed through the right display system from the right eye box; and dielectric gaps in the frame that form a segment of the frame that serves as an antenna, wherein the frame comprises a metal member that surrounds left and right lenses and wherein the segment comprises a metal segment of the metal member that forms an antenna resonating element for the antenna.

12. The head-mounted device defined in claim 11 wherein the antenna comprises a cellular telephone antenna.

13. The head-mounted device defined in claim 12 wherein the left display system comprises a left output coupler that overlaps the left lens and wherein the right display system comprises a right output coupler that overlaps the right lens.

14. The head-mounted device defined in claim 13 wherein the metal segment is formed along an upper edge of the frame.

15. The head-mounted device defined in claim 14 wherein the metal segment is formed along a lower edge of the frame.

16. A pair of glasses, comprising:

clear lenses through which real-world objects are viewable from eye boxes;

display systems configured to present images in the eye boxes;

a metal frame that extends around peripheral portions of the clear lenses;

left and right temples;

left and right hinges that respectively couple the left and right temples to corresponding left and right edges of the metal frame;

radio-frequency transceiver circuitry; and dielectric gaps in the metal frame that form a metal frame segment that serves as an antenna resonating element in an antenna that is coupled to the radio-frequency transceiver circuitry, wherein the dielectric gaps and the metal frame segment are formed along a lower edge of the metal frame below one of the clear lenses.

17. The pair of glasses defined in claim 16 wherein the radio-frequency transceiver circuitry comprises cellular telephone transceiver circuitry.

18. The pair of glasses defined in claim 17 further comprising a tunable component coupled to the antenna resonating element.

19. The pair of glasses defined in claim 18 wherein the antenna comprises an antenna selected from the group consisting of: a monopole antenna and an inverted-F antenna.

20. The pair of glasses defined in claim 16 further comprising additional dielectric gaps in the metal frame that form an additional metal frame segment that serves as an additional resonating element in an additional antenna, wherein the additional dielectric gaps and the additional metal frame segment are formed along a lower edge of the metal frame below another one of the clear lenses.

* * * * *